United States Patent [19]

Boss et al.

[11] 4,317,669
[45] Mar. 2, 1982

[54] GLASS MELTING FURNACE HAVING A SUBMERGED WEIR

[75] Inventors: Gerald R. Boss, Peru, Ill.; Alejandro G. Bueno, Toledo, Ohio

[73] Assignee: Libbey-Owens-Ford Company, Toledo, Ohio

[21] Appl. No.: 179,096

[22] Filed: Aug. 18, 1980

[51] Int. Cl.³ .............................................. C03B 5/16
[52] U.S. Cl. ........................................ 65/135; 65/137; 65/337; 65/340; 65/342; 65/346
[58] Field of Search ................ 65/135, 137, 340, 342, 65/337, 346, 347

[56] References Cited

U.S. PATENT DOCUMENTS

| 2,049,600 | 8/1936 | Wright | 65/137 X |
| 3,321,289 | 5/1967 | Touvay | 65/135 X |
| 3,328,150 | 6/1967 | Rough | 65/346 X |
| 4,046,546 | 9/1977 | Hynd | 65/135 |
| 4,052,186 | 10/1977 | Rhodes | 65/137 |

Primary Examiner—Arthur D. Kellogg
Attorney, Agent, or Firm—Collins, Oberlin & Darr

[57] ABSTRACT

A continuous tank-type glass melting furnace containing a bath of molten glass and having a waist section of reduced width whereat a submerged weir extends across the path of the molten glass bath flowing therethrough. The weir is located adjacent the floor of the waist section for modifying the flow path in the lower regions of the molten bath between the refining and conditioning zones of the furnace. Also, a surface barrier and stirrers may be provided in the waist section for improving the homogeneity of the molten bath.

12 Claims, 4 Drawing Figures

GLASS MELTING FURNACE HAVING A SUBMERGED WEIR

BACKGROUND OF THE INVENTION

1. Field of the Invention

This invention generally relates to continuous tank-type glass melting furnaces and, more particularly, to such furnaces having waist areas of reduced cross section interconnecting the melting and working zones whereat the flow, temperature and homogeneity of a glass bath may be controlled.

2. Description of the Prior Art

Conventionally, one type of continuous glass melting furnace is constructed with a lower tank section covered by an independently supported roof section, wherein the central region of the tank section is provided with a reduced waist which provides a passage of limited cross section intermediate the ends of the tank. This construction, in effect, forms separate melting and conditioning or working tanks or zones interconnected by a passage that is slightly smaller in width than the tanks so that the melting operation can be performed to optimize conditions in the melting tank and deliver properly refined molten glass to the conditioning zone. The size of the waist and, of course, the passage, is determined by the output and the operating conditions of the melting furnace. Such tanks are generally, but not necessarily, of constant depth and their width may or may not be constant, except for the waist section where the side walls are inset to provide the narrow region interconnecting the refining and conditioning zones of the tank for improving the homogeneity of the molten glass as it passes from the refining zone into the conditioning zone.

In such a continuous tank-type glass melting furnace, raw batch material and scrap glass or cullet are charged into one end of the furnace and molten glass is removed from its other end. The glass, in moving through the furnace, passes successively through melting, refining, conditioning or cooling, and working zones which are contiguous with one another. Heat is applied over the upper surface of the bath of glass in the melting zone through ports along the sides for reducing the newly added materials to a molten state and integrating them into the flowing molten bath, and the molten glass bath is refined and cooled to a point where it can be removed from the working zone to form a continuous ribbon.

Addition of heat to the molten glass bath and the charging of relatively cold glass making materials establish varying temperatures in the bath throughout the length of the tank. These variant temperatures, with other processes occurring in the tank, result in formation of a zone of maximum temperature commonly called a "hot spot". This hot spot normally occurs slightly downstream from the midpoint of the port area. One result of the temperature differential and the resulting hot spot is that thermal or convection currents are established in the molten bath which are of such directions that, rearwardly of the hot spot, the upper region of the molten glass tends to flow towards the charging end of the tank and forwardly of the hot spot, the upper region of the glass tends to move towards the discharge end of the tank. These convection currents are useful in that they tend to, in effect, create a barrier between the melting and fining zones beyond which any unmelted batch materials on the surface do not pass, as well as intermix the molten glass within the respective zones.

Since the instant invention is concerned with that circuit of the convection currents flowing from the hot spot towards the discharge end of the furnace, the following discussion will be limited thereto. This convection current is composed of two thermal currents, i.e, an upper, forwardly flowing surface current and a lower, rearwardly flowing return current. As is known, the surface of the molten bath is formed by hot glass of relatively low density, and it moves from the melting zone through the refining zone towards the discharge end of the tank where only a portion of the molten surface glass is removed from the furnace. As the remaining surface glass cools, its density increases and the cooler, more dense molten glass sinks to the lower levels of the bath to join the rearwardly flowing return current which flows back toward the hot spot of the furnace. In the melting zone of the tank, the molten glass in the return current becomes heated, rises to the surface at the hot spot, and begins to circulate again in the surface current.

As the molten glass advances along the tank from the melting zone, there may be areas of non-homogenous composition as well as temperature variations in the molten bath. As the molten glass bath passes through the refining zone, where a certain amount of mixing occurs due to the convection currents, entrapped gases are released and the molten bath becomes more equalized in temperature and composition. Since the surface of the molten bath may have a higher temperature than the remainder of the bath, there is a tendency for the surface layer of glass to flow more quickly through the waist area and into the working zone. To control the flow of the surface layer and cause intermingling of the glass in the upper region, floaters and skimmers, such as disclosed in U.S. Pat. No. 3,989,497, issused to Dickenson et al on Nov. 2, 1976, have been provided at the entrance end of the waist region. Also as shown therein, stirrers have been provided to further improve the homogeneity of the molten bath. Although these devices have served their intended purpose, still further improvement is sought in the homogeneity of the molten glass and utilization of the heat provided to the melting furnace.

Accordingly, it is desirable to improve the homogeneity of the molten bath to eliminate and/or reduce the number of optical defects that may occur in a glass ribbon produced from the molten bath, and to modify the temperature pattern within the molten glass in order to better utilize the heat supplied to the tank.

SUMMARY OF THE INVENTION

It has been discovered that the flow conditions and temperatures of the molten glass bath can be advantageously modified by positioning a weir within the bottom boundary layer of the molten bath across the waist section of the furnace, thereby improving homogenization of the molten bath while increasing bottom temperatures in the refining zone and lowering bottom temperatures in the conditioning zone. More particularly, by locating the weir within the waist, molten glass flow therethrough is reduced and the amount of heat transferred by the bath of molten glass from the melting and refining zones to the conditioning zone of the furnace is better controlled. By this control, the amount of heat transferred from the molten bath to the incoming glass making materials in the refining and melting zones can be increased and the amount of heat which must be dissipated within the conditioning zone can be decreased. In other words, this control of heat transfer retains heat in the melting zone where it is best utilized and produces a consequent reduction in the cooling required to bring the molten bath in the conditioning zone to the desired temperature at which the glass should exit the furnace.

Accordingly, a submerged weir located in the waist section of the glass melting furnace in a spaced relationship above the floor thereof has been found to impede the return flow of glass through the waist section and cause the molten glass flowing along the floor to flow upwardly over the weir, thereby enhancing the mixing action as well as advantageously modifying the temperature pattern in the molten bath at the bottom of the furnace. In other words, it has been found that a weir thus located in the waist section reduces convection flow between the refining and conditioning areas and thereby increases the overall melting efficiency of the furnace by increasing the dwell time of the molten bath within the melting area. Also, it has been found that when a waist surface barrier and a submerged weir are employed in combination, the molten glass in flowing through the waist section achieves a greater degree of homogeneity and the bottom temperatures in the melting zone are increased while the bottom temperatures in the working zone are decreased. As a consequence of the increased bottom temperatures in the melting zone the glass is less viscous in this region, with the highly desirable result that bubbles of entrapped gases work their way to the surface more readily.

Preferably, for coacting with a surface barrier the weir is located within the waist area at a position vertically beneath or downstream from the barrier to act as a physical obstruction restricting the return flow of the molten bath which, in turn, influences the heat transfer between the refining and conditioning zones of the furnace.

OBJECTS AND ADVANTAGES

An object of the invention is to provide a tank-type melting furnace having a waist section with a submerged weir for achieving improved homogeneity in the molten glass bath.

Another object of the invention is to advantageously modify the return flow pattern in the bottom boundary layer of the waist section of such a glass melting furnace in order to better utilize the heat supplied to the furnace.

Other objects and advantages will become more apparent during the course of the following description, when taken in connection with the accompanying drawings.

BRIEF DESCRIPTION OF THE DRAWINGS

In the drawings, wherein like numerals are employed to designate like parts throughout the same.

DESCRIPTION OF THE PREFERRED EMBODIMENT

Figure 1:
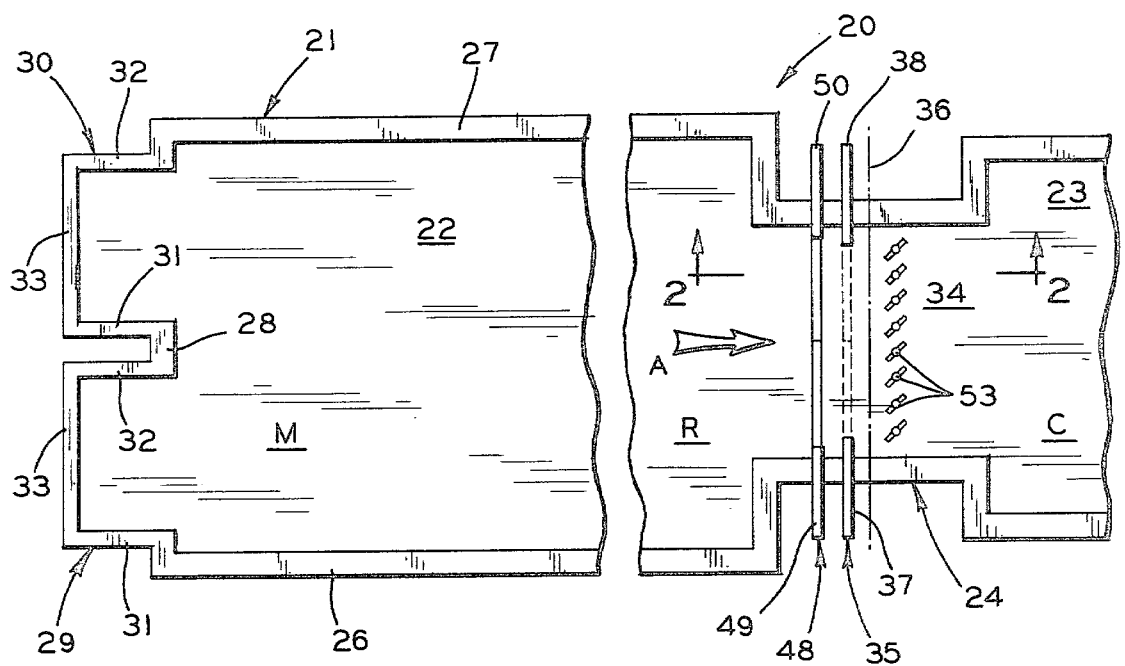
FIG. 1 is a broken plan view of a portion of a furnace embodying the invention and illustrating the reduced waist section interconnecting its melting and conditioning tanks.

With reference now to the drawings, and particularly to FIG. 1, there is illustrated a portion of a continuous tank-type glass melting furnace generally indicated by the reference numeral 20. Briefly, the glass melting furnace 20 comprises a lower longitudinally extending refractory tank indicated generally at 21 which is divided into a melting section 22 and a working section 23 by a reduced waist section 24. The tank 21 is formed with a floor 25, opposed side walls 26 and 27 and an end wall 28. Opening outwardly from the end wall 28 are spaced doghouse or batch charging areas 29 and 30, each doghouse area being defined by side walls 31 and 32 and an end wall 33. The tank 21 is of constant depth along its length and the width of its sections may be different as shown, or may be constant, except for the waist section 24 where the walls 26 and 27 are inset to provide a reduced passage 34, interconnecting the melting section 22 and the working section 23 for enhancing the homogeneity of molten glass passing therethrough.

As is well known, raw glass making materials, i.e., batch and cullet or scrap glass, are introduced into the doghouses 29 and 30 by feeder devices (not shown) and reduced to a molten state as by flames from burners (not shown) along either side of the furnace in a melting zone M forming part of the melting section 22. The molten body of materials is then refined in a refining zone R of the melting section 22 and flows forwardly in the direction of arrow A through the reduced passage 34 of the waist 24 into a conditioning zone C of the working section 23, and is thereafter removed from the exit end (not shown) of the tank 21.

Figure 2:
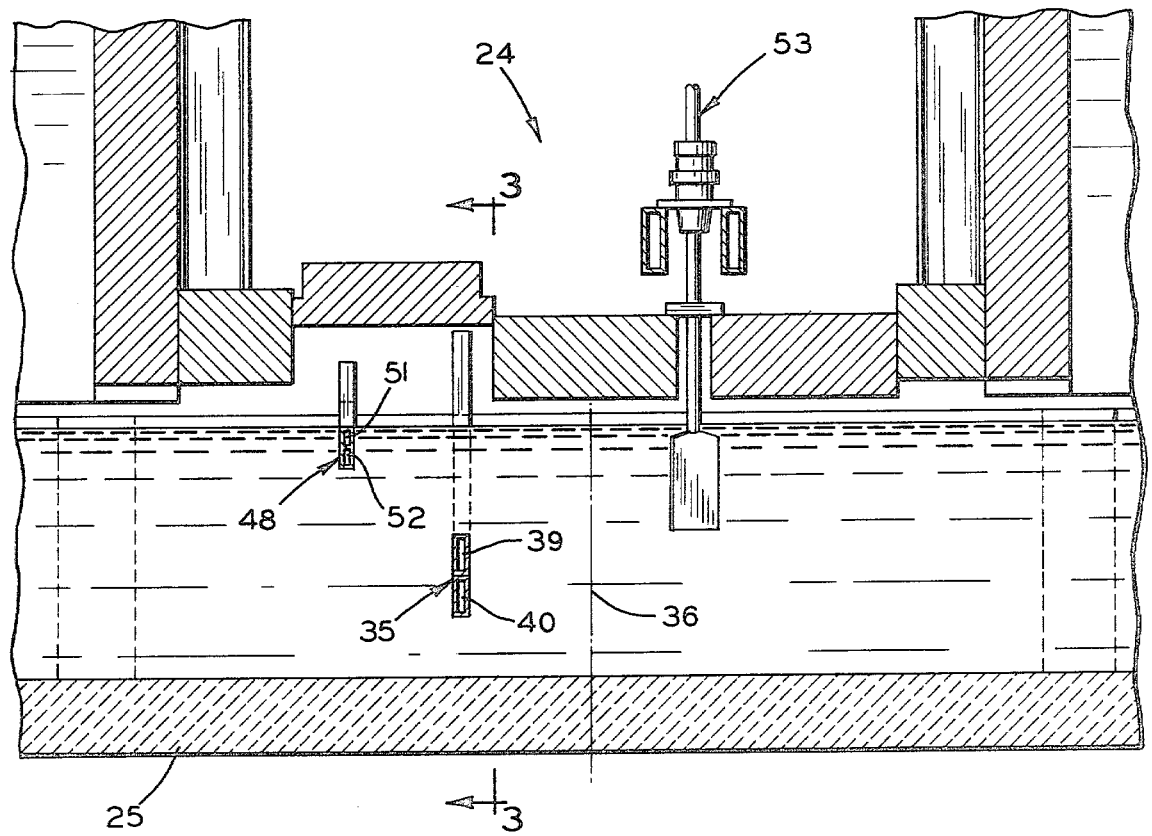
FIG. 2 is an enlarged elevational sectional view, taken substantially along line 2—2 of FIG. 1.

As shown in FIGS. 1 and 2, a submerged weir 35 providing a barrier in the bottom boundary layer of the molten glass for impeding its return flow, extends horizontally across the bottom portion of the waist 24 upstream of the longitudinal midpoint 36 of the waist passage 34. In this way, the normal laminar return flow of the molten glass bath from the conditioning zone C is impeded and the glass is caused to flow over and around the weir 35.

Figure 3:
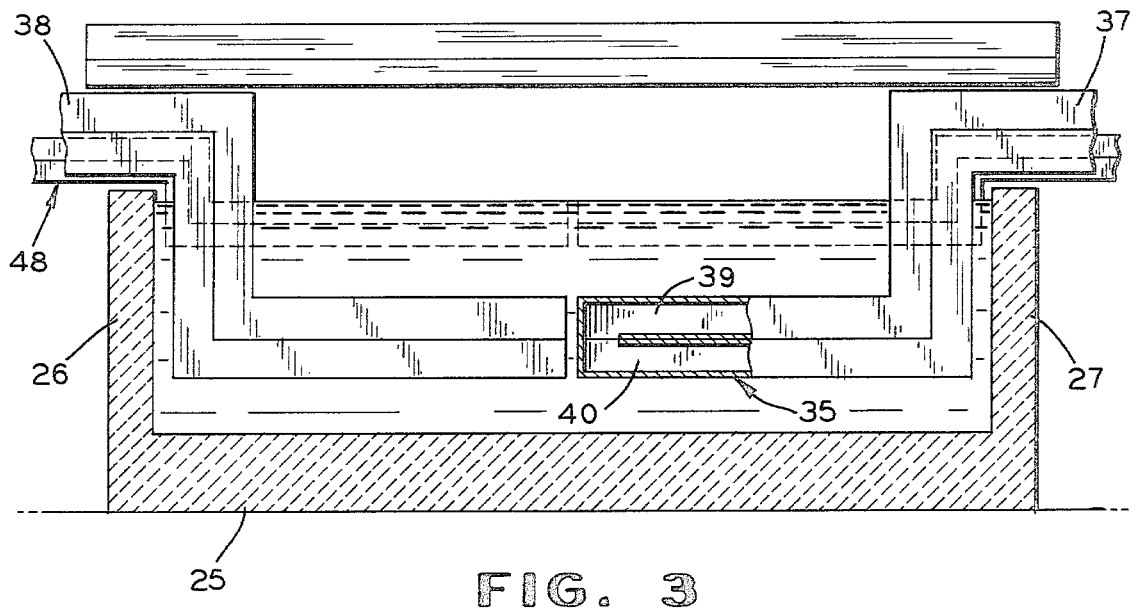
FIG. 3 is an enlarged cross sectional view of the waist section taken substantially along line 3—3 of FIG. 2.
Figure 4:
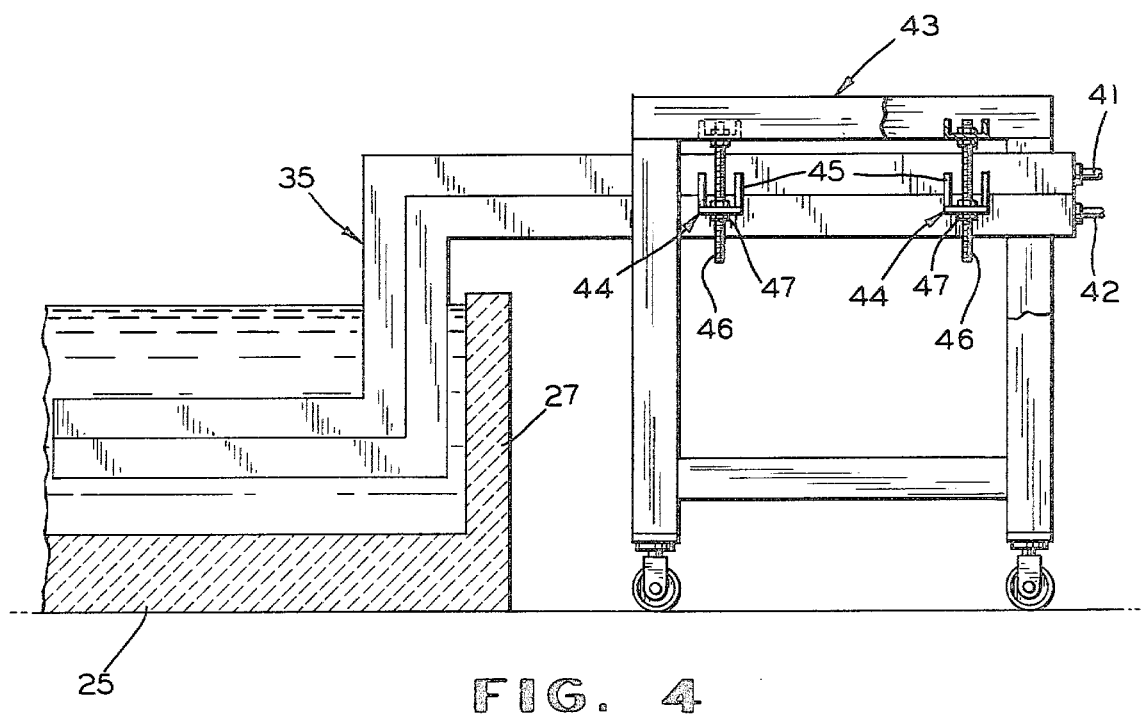
FIG. 4 is an enlarged fragmentary view illustrating an arrangement for supporting the submerged weir employed in the invention.

As illustrated in FIG. 3, the weir 35 may comprise a pair of barrier tubes 37 and 38, rectangularly shaped in cross section, each having interior passages 39 and 40 through which a liquid coolant, for instance water, is circulated via an inlet port 41 and an outlet port 42 (see FIG. 4). These barrier tubes 37 and 38 are bent to project inwardly from opposite sides of the waist 24 adjacent the floor 25, and each may be mounted on a stand generally indicated by the reference numeral 43 by a plurality of adjustable supports 44 comprising an arrangement of brackets 45, vertically disposed adjusting screws 46 and nuts 47.

Still referring to FIGS. 1 and 2, a surface barrier 48 is provided between the entrance to the waist 24 and the upstream side of the weir 35. The barrier may comprise a pair of tubes 49 and 50, each having interconnected interior passages 51 and 52 through which a coolant, for instance water, may be circulated in a manner similar to the weir 35. The tubes 49 and 50 are positioned at a height above the floor of the waist 24 so as to be located in the upper boundary region of the molten glass flowing forwardly into the conditioning zone C of the working section 23. Each tube 49 and 50 may be supported in a like manner as the tubes 37 and 38 of the weir 35.

Downstream of the weir 35, a row of stirrers 53 is provided to extend into the forward flow path of the molten glass flowing through the waist. The stirrers 53 are arranged side-by-side so as to extend across the waist as illustrated in FIG. 1, and are operated in a known manner. These stirrers also may be water cooled.

It has been found that the optical quality of the final glass product, as well as the operating efficiency of the furnace, is substantially improved by passing the molten glass from the refining zone R through the waist passage 34 whereat the upper forward flow of the bath is impeded by the barrier 48 and the return flow of the bath from the conditioning zone C is impeded by the weir 35, as well as stirring the forwardly flowing portion of the molten glass bath by the water cooled stirrers 53 as it moves toward the conditioning zone C.

It is to be understood that the form of the invention herewith shown and described, is to be taken as a preferred embodiment only of the same, and that various changes in the shape, size and arrangement of the parts may be resorted to without departing from the spirit of the invention.

We claim:

1. In a method of processing a bath of molten glass in a tank type melting furnace of substantially uniform depth throughout its length and having melting and working zones separated by a waist section of reduced width, including charging glass batch materials to one end of a melting tank, heating the batch materials in the melting zone of the tank for reducing them to a molten state and setting up convection currents therein, and passing the molten glass through the waist section to the working zone, said convection currents including a forward surface flow and return bottom flow of molten glass within said waist section, the improvement comprising impeding but not eliminating the return bottom flow of the molten glass passing through the waist section from the working zone to the melting zone.

2. A method of processing a bath of molten glass as claimed in claim 1, including the step of impeding the forward surface flow of the molten glass passing through the waist from the melting zone to the working zone by use of a horizontal barrier located in the upper region of the molten glass bath.

3. A method of processing a bath of molten glass as claimed in claim 1 or claim 2, including the step of stirring the bath of molten glass in the waist section.

4. A method of processing a bath of molten glass as claimed in claim 2, including the step of cooling the molten glass passing through the waist section.

5. In a tank type glass melting furnace including melting and working sections interconnected by a waist section of lesser width than said melting and working sections, and a bath of molten glass of substantially uniform depth throughout its length within said tank, wherein molten glass flows from said melting section to said working section through said waist section and includes convection currents providing a forward surface flow and return bottom flow of molten glass within said waist section, the improvement comprising a submerged weir extending horizontally across at least part of the width of the waist section and adjacent the bottom thereof, said weir being located within the normal path of the return flow of molten glass toward the melting section, whereby said return flow is impeded but not eliminated.

6. A glass melting furnace as claimed in claim 5, including means for adjusting the height of said weir in relation to the floor of the waist.

7. A glass melting furnace as claimed in claim 5, wherein said weir comprises at least one water cooled tube having a pair of passages.

8. A glass melting furnace as claimed in claim 7, wherein said weir comprises a pair of bent water cooled, tubes each having a horizontal arm, extending partly across the waist adjacent the floor thereof.

9. A glass melting furnace as claimed in claim 5, including a surface barrier positioned upstream of said weir and in the waist section.

10. A glass melting furnace as claimed in claim 5, including stirrers positioned downstream of said weir within the waist section for stirring the molten bath.

11. A glass melting furnace as claimed in claim 10, including a surface barrier positioned upstream of said weir and in the waist section.

12. A glass melting furnace as claimed in claim 11, including means for cooling said surface barrier.

* * * * *